United States Patent [19]

Nakagawa

[11] 4,092,093
[45] May 30, 1978

[54] APPARATUS FOR DEFORMING BOILED EGG

[75] Inventor: Masashi Nakagawa, Fukuyama, Japan

[73] Assignee: Kabushiki Kaisha Aiki Shoji, Fukuyama, Japan

[21] Appl. No.: 696,846

[22] Filed: Jun. 16, 1976

[51] Int. Cl.² .................................................. A23P 1/00
[52] U.S. Cl. ...................................... 425/398; 425/412
[58] Field of Search ............... 425/195, 412, 416, 420, 425/394, 398; 99/440; 264/325, 337, 239, 299; 426/298, 300, 614, 383, 512

[56] References Cited

U.S. PATENT DOCUMENTS

| 1,168,168 | 1/1916 | Cosseboom | 425/412 |
| 1,217,206 | 2/1917 | Nixon | 425/412 X |
| 1,782,076 | 11/1930 | Safford, Sr. | 425/412 X |

Primary Examiner—Francis S. Husar
Assistant Examiner—W. R. Briggs
Attorney, Agent, or Firm—Cushman, Darby & Cushman

[57] ABSTRACT

Apparatus and method for changing and setting a peeled, warm or hot hard-boiled egg into a desired shape, for example a cubic shape. This apparatus comprises a tubular chamber having a required inner cross sectional shape and having a threaded neck portion, a bottom plate for closing one end of the chamber, a pressing member for progressively pressing the boiled egg contained in the chamber, and a threaded cap for progressively threadably pressing the pressing member. By putting an unshelled hot egg soon after being boiled, then inserting the pressing member through an open inlet of the neck of the chamber and progressively pressing this egg thereby, and keeping this pressed state of the egg for some time while leaving it to be cooled, it is possible to obtain a boiled egg which has been changed into a shape defined by the chamber and the pressing member. Also, by the use of a bottom plate having indentation formed on its egg-contacting surface, and after the processed egg is taken out, by cutting away those portions of the egg which have filled in the indentation when the egg was pressed, the surface of the boiled egg is imparted with the pattern of the indentation.

10 Claims, 11 Drawing Figures

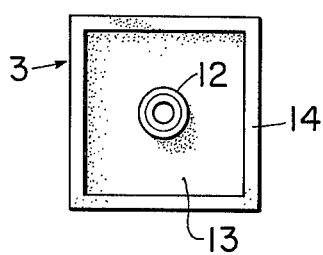
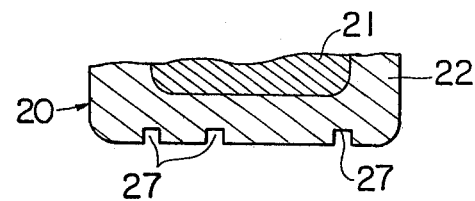
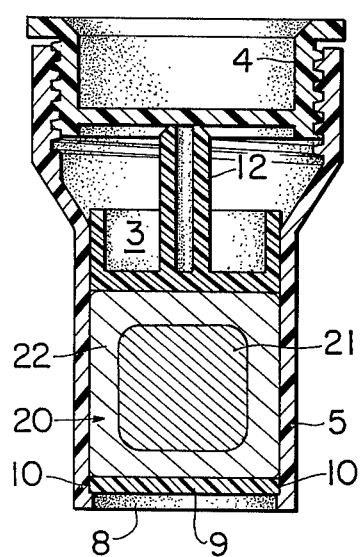
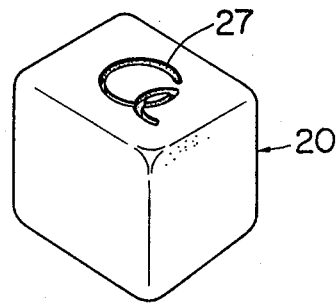
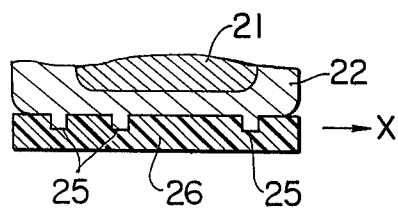
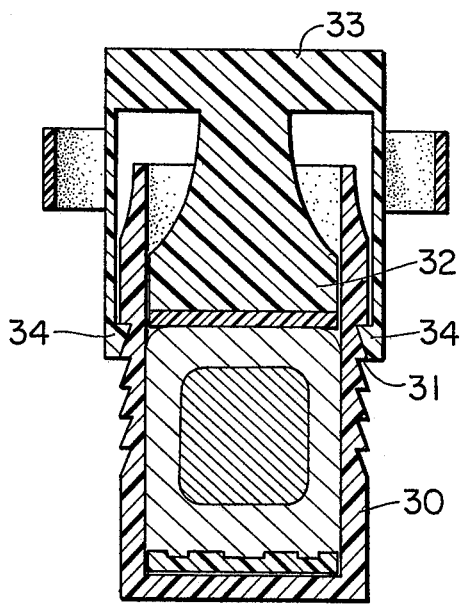

APPARATUS FOR DEFORMING BOILED EGG

BACKGROUND OF THE INVENTION a. Field of the Invention

The present invention relates to an apparatus and a method for changing and setting a peeled, warm or hot hard-boiled egg into a desired shape.

b. Description of the Prior Art

There has been widely practiced to use boiled eggs as ornamental foods not only in the cuisine of Japan but also of many other countries. For the purpose of using boiled eggs as ornamental foods, there has been devised various ways and patterns of cutting boiled eggs. It is, however, troublesome and time-consuming to change the original natural shape of the boiled egg into a desired shape by cutting it with a knife. Thus, it has been difficult to produce variation-rich shapes of boiled eggs in a simplified manner by cutting boiled eggs.

SUMMARY OF THE INVENTION

A peeled hot boiled egg immediately after having been hard-boiled will have a considerably great softness, flexibility and elasticity until this egg is cooled. By pressing this boiled egg while it is substantially hot, i.e., at least warm, it is possible to change and set not only the white but also the yolk of the boiled egg into a desired shape. The inventor, based on this discovery, intends to provide boiled egg having a unique shape by changing the natural shape of the original peeled boiled egg into a completely different desired shape.

It is therefore, an object of the present invention to provide an apparatus and a method for changing a whole boiled egg into an aesthetic cubic shape.

Another object of the present invention is to provide an apparatus and a method for molding, into a desired shape, not only the white alone of a peeled hard boiled egg but also its yolk without causing destruction of these two portions of the egg.

Still another object of the present invention is to provide an apparatus and a method for deforming a peeled hard boiled egg and at the same time for imparting a desired indented pattern or desired indented letters or symbols onto the surface of this boiled egg.

BRIEF DESCRIPTION OF THE DRAWINGS

FIG. 6 is a plan view of the pressing member of FIG. 3.

FIG. 7 is a sectional view of the apparatus in the state in which a peeled hard boiled egg is being pressed.

FIG. 8 is a fragmentary sectional view showing a portion of the molded boiled egg engaging a bottom plate having an indented pattern formed on the egg-contacting surface thereof.

FIG. 9 is an explanatory illustration showing a section of the pattern imparted on the surface of the molded boiled egg.

FIG. 10 is a perspective view of a molded boiled egg having a deformed cubic shape and having a surface pattern, both of which have been produced by the apparatus of FIG. 1.

FIG. 11 is a sectional view of a modified apparatus embodying the present invention.

DETAILED DESCRIPTION OF THE PREFERRED EMBODIMENTS

According to the present invention there is provided a method for obtaining a deformed a peeled hard boiled egg by the use of an apparatus having a tubular chamber having a required cross sectional shape and having a threaded neck portion, a bottom plate for closing one end of the chamber, a pressing member for progressively pressing the boiled egg contained in the chamber, and a threaded cap for progressively threadably pressing the pressing member.

According to this method, a peeled hard boiled egg is put, while it is still hot or at least warm, into a tubular container having a desired cross sectional shape, and then this egg is pressed against the inner walls of the container by a pressing member having an end surface whose shape is substantially the same with the inner cross sectional shape of the container, thereby changing the initial natural shape of the egg into a different cubic shape which is defined by the inner walls of the container and the end surface of the pressing member, and this altered shape of the egg is set as the egg is cooled.

According to the present invention, the inner cross sectional shape of the tubular container and also the shape of the end surface of the associated pressing member can have, for example, a triangular, a square, a rectangular, a pentagonal, a hexagonal shape, or a round shape. By using the two members having the afore-mentioned shapes, it is possible to obtain a boiled egg having either a triangular-columnar, a square-columnar, a four-cornered columnar, a pentagonal-columnar, a hexagonal-columnar or a cylindrical shape.

Description will hereunder be made on an example of the apparatus designed for changing the initial natural shape of a peeled hard boiled egg into a square columnar shape, especially into a cubic body, by referring to the accompanying drawings.

Figure 1:
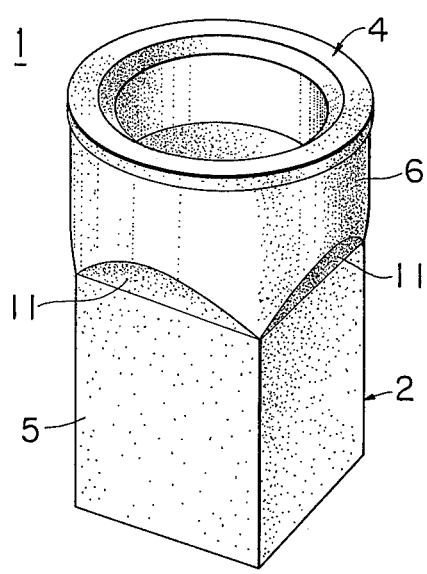
FIG. 1 is a perspective view of the entire apparatus designed for changing the original natural shape of a peeled hard boiled egg, according to the present invention.
Figure 2:
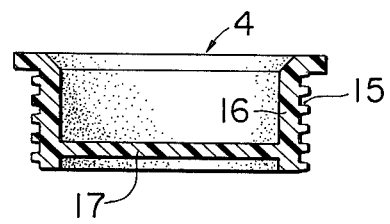
FIG. 2 is a sectional view of a threaded cap of the apparatus of FIG. 1.

Referring now to FIG. 1, there is shown an apparatus indicated generally at 1 for changing the initial natural shape of a boiled egg into a cubic body. As shown in FIGS. 1 through 4, the shape-changing apparatus 1 is comprised of: a hollow main body 2 having a threaded neck portion for containing therein a peeled hard boiled egg which is to be changed into a different cubic shape; a pressing member, i.e. a piston 3, which is to be inserted into the hollow main body 2; and a threaded cap 4 for causing an advancing movement of the pressing member 3 toward the bottom of the main body 2.

Figure 5:
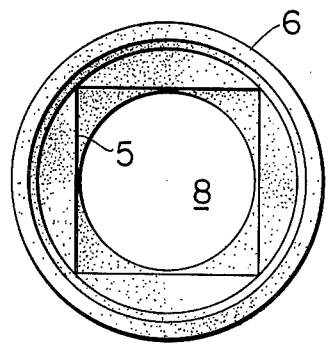
FIG. 5 is a plan view of the hollow main body of the apparatus shown in FIG. 4.

The hollow main body 2 desirably is formed with a material which is either transparent or translucent in order that the state of change of the shape of the boiled egg contained in the hollow main body 2 may be viewed externally. For example, the main body 2 may be made with a transparent plastic material. As shown in FIG. 5, the hollow main body 2 is constructed of a tubular chamber 5 having a square inner cross section, and a tubular neck portion 6 integrally joining the tubular chamber 5 and having a threaded groove 7 formed on the inside of the neck portion so that the threaded cap 4 which will be described later in further detail may be screwed onto the threaded neck portion 6 of the tubular chamber 5. The length of each one side of the inner square cross section of the chamber 5 is determined by taking into consideration the average value or the minimum value of the cubic volume of eggs. More specifically, in order that the initial shelled boiled egg may be changed into a desired cubic body, it should be understood that the length of each one side of the inner square cross section of the chamber 5 is required to be equal to a cubic root of the volume of an egg. From the result of measurement of the volume of eggs, it is desirable to set the length of one each side of the inner square cross section of the chamber 5 at a value between 3 cm inclusive and 5 cm inclusive. According to the experiments conducted by the inventor, there were obtained a very good result of deformed boiled egg for almost each of the tested samples when, especially, said length of each one side was 3.9 cm, i.e. the cross sectional area was 15.21 cm$^2$.

The bottom wall of the main body 2 is provided with an opening 8 having a round shape. As will be described later, this opening 8 is intended to facilitate the escape of moisture or air from the chamber 5 when the hot boiled egg is subjected to deformation and also to facilitate an easy removal of the deformed egg from the chamber 5. Thus, this opening 8 may have any desired shape. When it is intended to obtain a deformed boiled egg, it should be understood that, prior to putting peeled, hot hard boiled egg into the hollow main body 2, a bottom plate 9 having a square shape corresponding to the inner cross section of the main body 2 is placed on the inner side of the bottom of the main body 2 so as to cover the opening 8. It is, however, desirable to provide a gap 10 between this bottom plate 9 and the side walls of the chamber 5 to let the air and the moisture to escape therethrough. It should be understood, however, that in case this gap 10 is excessively large, a portion or portions of the boiled egg which is contained in the chamber 5 will be forced into this gap 10 when the egg is pressed by the pressing member, and that this will constitute a cause for the development of cracks in the boiled egg. Accordingly, the gap 10 desirably has a dimension of from 0.2 mm to 0.3 mm.

The inner diameter of the tubular neck portion 6 of the main body 2 need to have such a dimension that will allow free passage therethrough of both the boiled egg and the pressing member 3 which will be described later in detail. For example, this inner diameter desirably is either equal to or slightly greater than the length of the diagonal line of the square cross section of the chamber 5. The chamber 5 and the tubular neck portion 6 are joined together by a gently inclined portion 11.

Figure 3:
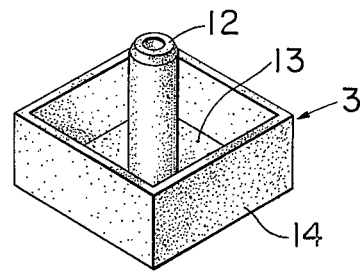
FIG. 3 is a perspective view of a pressing member of the apparatus of FIG. 1.

The pressing member 3, as shown in FIG. 3, is constructed of a shaft 12, a pressing surface portion 13 of a square shape, and a guide surface portion 14, all of which are formed to constitute an integral member. The pressing surface portion 13 is of a shape substantially identical with the inner cross section of the chamber 5. As will be described later, this pressing member 3 is inserted into the chamber 5 after peeled, hot hard boiled egg has been placed into the chamber 5, so as to apply a pressure onto this egg within the chamber 5.

The cap 4 is constructed of a tubular side wall 16 having a threaded groove 15 formed on the outer side of this side wall 16 in such a way that this threaded groove 15 is adapted to engage the threaded groove 7 which is formed on the inner side of the tubular neck portion 6 of the main body 2. The distance of the threaded groove 15 region is selected so that it is greater than the difference between the length of the longitudinal axis of the boiled egg prior to being deformed and the length of one side of the cubic egg after being deformed. This distance of the threaded groove 15 region, desirably, is 1.5 cm or more, preferably, 2.0 cm or more. As the cap 4 is screwed progressively onto the threaded neck portion 6 of the main body 2, the lower end wall 17 of this cap 4 will act so as to progressively depress the abutting end of the shaft 12 of the pressing member 3.

Figure 4:
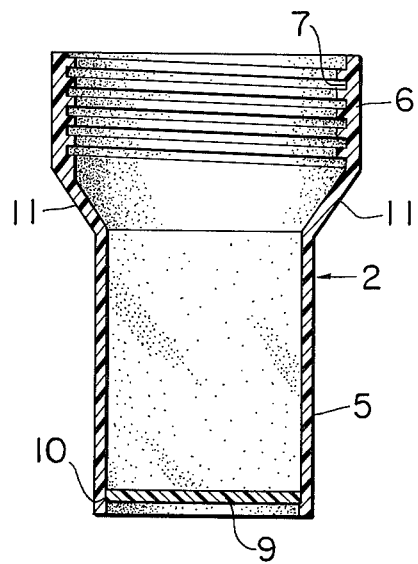
FIG. 4 is a sectional view of the body of the apparatus of FIG. 1.

Next, description will be made on the method of deforming peeled, hot hard boiled egg into a cubic body of a different shape by the use of an apparatus shown in FIGS. 1 through 6. As a first step, a peeled hard boiled egg which, desirably, is still hot is placed into the main body 2 which already has therein the bottom plate 9 deposited on the bottom of the main body as shown in FIG. 4. Thereafter, the pressing member 3 is inserted into the main body 2 from above this boiled egg in such a manner as shown in FIG. 7. Then, the cap 4 is progressively screwed onto the threaded neck portion 6. Whereupon, the shaft 12 is depressed progressively downwardly by its engagement with the bottom end 17 of the cap 4. Thus, the boiled egg 20 is progressively pressed by the pressing surface 13 of the pressing member 3. As a result, the boiled egg 20 will deform into a shape which agrees with the shape of a cube defined by the inner walls of the chamber 5 and the pressing surface 11 of the pressing member 3, as shown in FIG. 7. It should be understood that this deformation is arranged to be conducted, short of breakage of the boiled egg. Accordingly, there usually takes place no breakage of the boiled egg. It should be understood also that the yolk 21 itself will be deformed substantially into a cubic shape as shown in FIG. 7 in conformity with the deformation of the white 22 of the egg.

As the boiled egg is being deformed, both the air and the moisture which are enclosed within the main body 2 will be expelled progressively with the lowering of the pressing member 3, through the gap 10 which is provided between a side wall of the chamber 5 and the bottom plate 9 and through the opening 8 provided through the bottom wall of the chamber 5.

The boiled egg which has thus been deformed as shown in FIG. 7 requires to be left in its pressed state in the chamber 5 for a certain period of time, since the boiled egg, as taken out immediately after being pressed, will tend to restore its initial natural shape due to its own elasticity. In order to make this waiting time short, it is desirable to cool the egg-containing apparatus in water or in a refrigerator. It should be understood also that the boiled egg which is subjected to deformation, desirably, is hot. However, a boiled egg which has lost some of its heat (i.e., is still warm) can be deformed, equally as in the case of a hot boiled egg, if the egg is kept in its pressed state for a slightly prolonged period of time.

When it is intended to take out the deformed boiled egg from the main body 2, the cap 4 is removed from the main body 2, and then the pressing member 3 is withdrawn from within the main body 2 by simply pulling its shaft 12, and thereafter the main body 2 is positioned upside down. Whereupon, the deformed boiled egg will easily come out from the main body 2. This is because the boiled egg has undergone a slight shrinkage due to its cooling.

Next, description will be made on the method of performing a deformation and of simultaneously impressing an indented pattern or letters on the surface of this deformed boiled egg.

By merely providing an indentation of such pattern on the egg-contacting surface of the bottom plate 9 or on the pressing surface 13 of the pressing member 3, it is possible to impress such a pattern on that portion of the surface of the boiled egg which is pressed against such pattern of the bottom plate or of the pressing member. It should be understood, however, that the deformed boiled egg soon after being taken out from the apparatus still has some restoring force. Therefore, the indented pattern which has thus been formed on the surface of the deformed egg will be such that the edges of the indentations will become rounded due to the bulging action of these portions to the extent of, for example, 1 mm – 2 mm. As a result, the pattern will lose its sharpness. According to an aspect of the method of the present invention which will be described hereunder, it is possible to impress a very clear and sharp pattern on the surface of the deformed boiled egg.

This method will be explained hereunder by referring to FIGS. 8, 9, and 10. A bottom plate 26 which already has been provided with a required pattern formed by a recessed groove 25 is used in place of the bottom plate 9 having a smooth surface. A peeled, hot or at least warm, hard boiled egg is subjected to deformation in substantially the same manner as has been discussed above by the use of this bottom plate 26. As will be understood, during the deformation process, a portion of the white 22 of the boiled egg is forced to be filled in this recessed groove 25. This recessed groove 25 desirably is provided with fine perforations (not shown) through which air or moisture can be expelled. According to this aspect of the method, it should be understood that, when it is intended to take out the deformed boiled egg from the main body 2, it is necessary to take out the bottom plate 25 in its state of adhering to the surface of the boiled egg, as shown in FIG. 8. After the boiled egg has been taken out in this state, the bottom plate 25 is slidably moved in a direction parallel to the surface of the deformed boiled egg, i.e. in the direction of the arrow X shown in FIG. 8. By doing so, the portion of the white 22 of the boiled egg which is filled in the recessed groove 25 is sheared apart. The resulting surface of the boiled egg having a portion of its white 22 removed therefrom will have a recessed groove 27 formation as shown in FIG. 9 and FIG. 10 because of the tendency of the boiled egg to resume its initial shape. The extent of this restoring force exerted by the boiled egg is usually 1 mm – 2 mm. Therefore, the pattern which is obtained is understood to be constructed by the recessed groove 27 having a certain length, and this pattern will be obtained as a very sharp one. It should be understood that, by providing on the inside of a side wall of the chamber 5 a plate having a recessed groove formation, or by providing on the inside of the chamber 5 a square tubular sleeve having recessed grooves formed on the inner sides of this sleeve, it is also possible to form, on the surface of the deformed boiled egg, a pattern which is constructed by such recessed groove or grooves having a certain length or lengths.

As stated above, according to the apparatus and the method of the present invention, a boiled egg can be easily deformed into any desired cubic shape. Especially, by constructing the chamber 5 with a transparent or a translucent material, it is possible for the operator to determine the degree of the depth of screwing of the cap 2 while being able to view the deforming state of the boiled egg externally. Thus, it is possible to easily deform a boiled egg without applying an excessive pressing force thereto.

Description has been made on an example of the apparatus according to the present invention for deforming a boiled egg into a cube shape from the original shape of the egg, by referring to the accompanying drawings. It should be understood to those skilled in the art that various modifications and changes may be made within the scope and the spirit of the present invention. For example, by the use of a chamber 5 having its inner configuration which is triangular or round and by the use of a pressing member having a pressing surface with a corresponding shape, it is possible to deform a boiled egg into a triangular column or a cylindrical shape.

Also, as a method of pressing the boiled egg, there can be employed various known means. For example, as shown in FIG. 11, a boiled egg can be constricted progressively by the progressive meshing engagement between the tooth 31 formed on the outside surface of the cap 33 which is integrally coupled at its bottom to a pressing member 32.

The boiled egg which has been deformed according to the present invention has a unique cubic shape, so that such an egg can be widely utilized in cuisine. It should be noted especially that the yolk is deformed in substantially the same manner as the white, i.e. in conformity with the external deformed shape of the boiled egg. Thus, there can be obtained a new, interesting boiled egg which is different from the conventional shape of a boiled egg.

Also, according to the apparatus of the present invention, a boiled egg can be easily deformed into any desired shape.

Furthermore, the boiled egg which has been deformed according to the present invention is such that the whole of the boiled egg is constricted from its original volume and shape which this boiled egg had prior to being pressed. Therefore, the deformed egg will have an increased density in its body and, moreover, it will have a smooth surface and an enhanced luster, and it will give a richer taste.

I claim:

1. An apparatus for deforming a boiled egg, comprising:
   a chamber defining a tubular space of a desired configuration;
   means positioned to close one end of said tubular space;
   smoothly inclined portion extending continuously from the top edges of the other end of said tubular space and having a progressively enlarged cross section as it goes farther from the top edges of said tubular space, said cross section of the inclined portion being larger than the cross section of the tubular space;
   a pressing member having a pressing surface with a shape substantially identical with the cross section of said tubular space; and
   means operable to move said pressing member within said chamber.

2. An apparatus according to claim 1, in which: said tubular space has a square cross section.

3. An apparatus according to claim 2, in which:

each side of said square cross section is between 3 cm and 5 cm in length.

4. An apparatus according to claim 1, further comprising:
a cylindrical neck portion having a threaded groove and coupled to one end of said chamber, and in which;
said means of moving the pressing member is constructed of a cap having a threaded groove, and said threaded groove formed on said cylindrical neck portion for engagement with said threaded groove of said cap.

5. An apparatus according to claim 1, in which:
said means for moving the pressing member is constructed of a cap having a tooth, and a tooth formed on said chamber for engagement with said tooth of the cap.

6. An apparatus according to claim 1, in which:
said means for closing one end of said tubular space is constructed of a removable bottom plate applied to the bottom of said chamber in this chamber.

7. An apparatus according to claim 6, in which:
said bottom plate is of a dimension defining, between this bottom plate and a side wall of said chamber, a gap which allows the passage therethrough of air and moisture but does not allow the passage of a portion of the boiled egg itself therethrough.

8. An apparatus according to claim 6, in which:
said bottom plate has a recessed groove pattern formed on one surface thereof.

9. An apparatus for deforming a boiled egg, comprising:
a main body consisting of a chamber defining a square tubular space therein and having an open top end and an open bottom end and a tubular portion coupled to said open top end through a smoothly inclined portion extending continuously from the edges of said open top end of said tubular space and having a progressively enlarged cross section as it goes farther from the top edges of said tubular space, said cross section of the inclined portion being larger than the cross section of the tubular space;
means positioned to close said open bottom end of said chamber;
a gap defined between said closing means and the inner side walls of said chamber for the passage of air and moisture therethrough;
a pressing member having a pressing surface with a shape substantially identical with the cross section of said tubular space; and
a cap having a threaded groove engaging in the threaded groove provided on said tubular portion and having a portion for pressing-on said pressing member.

10. An apparatus according to claim 9, in which:
said means for closing said opening provided on the other end of the chamber is constructed of a bottom plate having a pattern of a recessed groove.

* * * * *